(12) United States Patent
Sakuma et al.

(10) Patent No.: US 12,466,757 B2
(45) Date of Patent: Nov. 11, 2025

(54) PRODUCTION METHOD FOR OPTICAL FIBER BASE MATERIAL, AND OPTICAL FIBER BASE MATERIAL

(71) Applicant: SUMITOMO ELECTRIC INDUSTRIES, LTD., Osaka (JP)

(72) Inventors: Hirotaka Sakuma, Osaka (JP); Yuki Kawaguchi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 341 days.

(21) Appl. No.: 18/019,538

(22) PCT Filed: Aug. 27, 2021

(86) PCT No.: PCT/JP2021/031564
§ 371 (c)(1),
(2) Date: Feb. 3, 2023

(87) PCT Pub. No.: WO2022/050190
PCT Pub. Date: Mar. 10, 2022

(65) Prior Publication Data
US 2023/0322605 A1 Oct. 12, 2023

(30) Foreign Application Priority Data
Sep. 3, 2020 (JP) ................. 2020-148202

(51) Int. Cl.
C03B 37/012 (2006.01)
C03B 37/014 (2006.01)

(52) U.S. Cl.
CPC .. *C03B 37/01211* (2013.01); *C03B 37/01228* (2013.01); *C03B 37/014* (2013.01);
(Continued)

(58) Field of Classification Search
None
See application file for complete search history.

(56) References Cited

U.S. PATENT DOCUMENTS

2007/0297735 A1* 12/2007 Khrapko ........... C03B 37/01807
385/127
2012/0198891 A1 8/2012 Tamura et al.
(Continued)

FOREIGN PATENT DOCUMENTS

CN 102627398 A 8/2012
JP 2005-537210 A 12/2005
(Continued)

*Primary Examiner* — Lisa L Herring
(74) *Attorney, Agent, or Firm* — Faegre Drinker Biddle & Reath LLP (57) ABSTRACT

A method for manufacturing an optical fiber preform made of silica-based glass, the method including: forming a core portion; and forming a cladding portion surrounding the core portion, the cladding portion having a refractive index lower than a refractive index of the core portion, wherein the forming the core portion includes: adding an alkali element group consisting of an alkali metal element and an alkaline earth metal element to an inner surface of a glass pipe made of silica-based glass; and integrating the glass pipe and a glass rod disposed inside the glass pipe to form an integrated rod after the adding.

12 Claims, 3 Drawing Sheets

(52) U.S. Cl.
CPC ...... *C03B 2201/12* (2013.01); *C03B 2201/20* (2013.01); *C03B 2201/50* (2013.01); *C03B 2203/22* (2013.01)

(56) References Cited

U.S. PATENT DOCUMENTS

| | | |
|---|---|---|
| 2012/0263427 A1 | 10/2012 | Hirano et al. |
| 2014/0370287 A1 | 12/2014 | Tamura et al. |
| 2015/0241629 A1 | 8/2015 | Tamura et al. |
| 2015/0316712 A1 | 11/2015 | Anderson et al. |
| 2017/0022094 A1 | 1/2017 | Yan et al. |
| 2017/0101334 A1 | 4/2017 | Haruna et al. |
| 2017/0137316 A1 | 5/2017 | Aiso et al. |
| 2018/0251397 A1* | 9/2018 | Yan ................... C03C 13/046 |
| 2018/0362392 A1 | 12/2018 | Sakuma et al. |
| 2019/0016630 A1 | 1/2019 | Morita et al. |
| 2021/0171390 A1 | 6/2021 | Tamura et al. |

FOREIGN PATENT DOCUMENTS

| | | |
|---|---|---|
| JP | 2015-157726 A | 9/2015 |
| JP | 2017-027050 A | 2/2017 |
| JP | 2019-019013 A | 2/2019 |
| WO | WO-2004/020357 A2 | 3/2004 |
| WO | WO-2005/021455 A2 | 3/2005 |
| WO | WO-2013/111470 A1 | 8/2013 |
| WO | WO-2016/021576 A1 | 2/2016 |
| WO | WO-2017/164025 A1 | 9/2017 |
| WO | WO-2020/027063 A1 | 2/2020 |

\* cited by examiner

PRODUCTION METHOD FOR OPTICAL FIBER BASE MATERIAL, AND OPTICAL FIBER BASE MATERIAL

TECHNICAL FIELD

The present application claims priority to Japanese Patent Application No. 2020-148202 filed on Sep. 3, 2020, and the entire contents of the Japanese patent application are incorporated herein by reference.

The present disclosure relates to a method for manufacturing an optical fiber preform and an optical fiber preform.

BACKGROUND ART

When an optical fiber is manufactured by drawing an optical fiber preform in which a core portion formed of the silica-based glass includes an alkali metal element or an alkaline earth metal element, viscosity of the core may be reduced and rearrangement of the glass may be promoted. Therefore, the transmission loss of the optical fiber caused by the rayleigh scattering is reduced. As a result, the transmission loss can be reduced.

Patent Literatures 1, 2, and 3 describe methods for adding an alkali metal element or an alkaline earth metal element to a core portion of an optical fiber preform by a diffusion method.

CITATION LIST

Patent Literature

Patent Literature 1: International Publication No. 2004/020357
Patent Literature 2: International Publication No. 2005/021455
Patent Literature 3: International Publication No. 2013/111470

SUMMARY OF INVENTION

A method for manufacturing an optical fiber preform of the present disclosure is a method for manufacturing an optical fiber preform made of silica-based glass, the method including: forming a core portion; and forming a cladding portion that has a refractive index lower than a refractive index of the core portion and surrounds the core portion. The forming the core portion includes: adding an alkali element group including an alkali metal element and an alkaline earth metal element to an inner surface of a glass pipe made of silica-based glass; and integrating the glass pipe and a glass rod disposed inside the glass pipe to form an integrated rod after the adding.

An optical fiber preform of the present disclosure is an optical fiber preform made of silica-based glass, comprising: a core portion including an alkali element group including an alkali metal element and an alkaline earth metal element; and a cladding portion that has a refractive index lower than a refractive index of the core portion and surrounds the core portion. The core portion includes a region that has a mass fraction of chlorine lower than a mass fraction of chlorine on a central axis of the core portion. A mass fraction of the alkali element group in the core portion has a maximum value in a region other than the central axis.

DESCRIPTION OF EMBODIMENTS

Problems to be Solved by the Present Disclosure

In the methods described in Patent Literatures 1, 2, and 3, adding an alkali metal element or an alkaline earth metal element to the inner surface of a glass pipe, reducing the diameter, etching, and the like are performed, and then a glass body serving as a core portion of an optical fiber preform is produced. However, since the inside of the glass pipe is hollow, the volume (amount of glass) of the glass pipe is smaller than that of a glass cylindrical body having the same outer diameter. Therefore, the productivity is low.

An object of the present disclosure is to provide a method for manufacturing an optical fiber preform capable of improving productivity while suppressing transmission loss.

Effects of the Present Disclosure

According to the present disclosure, it is possible to provide a method for manufacturing an optical fiber preform and an optical fiber preform capable of improving productivity while suppressing transmission loss.

Description of Embodiments of the Present Disclosure

Embodiments of the present disclosure are first listed and described. A method for manufacturing an optical fiber preform according to an embodiment of the present disclosure is a method for manufacturing an optical fiber preform made of silica-based glass, the method including: forming a core portion; and forming a cladding portion that has a refractive index lower than a refractive index of the core portion and surrounds the core portion. The forming the core portion includes: adding an alkali element group including an alkali metal element and an alkaline earth metal element to an inner surface of a glass pipe made of silica-based glass; and integrating the glass pipe and a glass rod disposed inside the glass pipe to form an integrated rod after the adding.

In the method for manufacturing the optical fiber preform, since the alkali element group is added to the inner surface of the glass pipe, the transmission loss can be reduced. Further, since the glass pipe and the glass rod disposed inside the glass pipe are integrated with each other, productivity can be improved as compared with a case where the glass pipe is solidified to form a glass body serving as the core portion.

The forming the core portion may further include reducing a diameter of the glass pipe between the adding and the integrating. When the diameter of the glass rod used is greatly different from the hole diameter of the glass pipe, a non-circle is likely to occur in the core portion after integration. In this case, since the hole diameter of the glass pipe can be brought close to the diameter of the glass rod by diameter reduction, occurrence of a non-circle in the core portion is suppressed.

The forming the core portion may further include etching an inner surface of the glass pipe between the adding and the integrating. In this case, impurities added to the inner surface of the glass pipe together with the alkali element group may be removed.

A mean value of a mass fraction of chlorine in the glass rod may be 20 ppm or greater and 2000 ppm or less.

A mean value of a mass fraction of chlorine in the glass pipe may be 20 ppm or greater and 2000 ppm or less.

A mean value of a mass fraction of fluorine in the glass rod may be 200 ppm or greater and 5000 ppm or less. In this case, the number of abnormal portions of the optical fiber preform may be suppressed. Here, the abnormal portion indicates a portion which is for example, a crystal of glass caused by a foreign matter or a compound of an alkali element group and chlorine or fluorine, and becomes a defective portion when an optical fiber is formed later.

A mean value of a mass fraction of fluorine in the glass pipe may be 200 ppm or greater and 5000 ppm or less. In this case, the number of abnormal portions of the optical fiber preform may be suppressed.

The glass rod may include an outer peripheral portion that including an outer peripheral surface of the glass rod and having a thickness of 0.5 mm. A mean value of a mass fraction of chlorine in the outer peripheral portion may be lower than a mean value of a mass fraction of chlorine in an entirety of the glass rod. In this case, the number of abnormal portions of the optical fiber preform may be suppressed.

The mean value of the mass fraction of chlorine in the outer peripheral portion may be 20 ppm or greater and 2000 ppm or less. In this case, the number of abnormal portions of the optical fiber preform may be suppressed.

The forming the core portion further may include applying a glass layer around the integrated rod, the glass layer having a refractive index higher than that of the cladding portion. In this case, the degree of freedom in designing optical characteristics such as an effective cross-sectional area (Aeff) or a cut-off wavelength can be increased.

A mean value of a mass fraction of chlorine in the glass layer may be 100 ppm or greater and 2000 ppm or less. In this case, by being 100 ppm or greater, an increase in loss due to glass defects can be suppressed, and transmission loss can be suppressed. When it is greater than 2000 ppm, the occurrence frequency of the preform abnormality increases and the yield decreases.

A mean mass fraction of the alkali element group included in the integrated rod may be 0.2 ppm or greater and 300 ppm or less. In this case, transmission loss can be suppressed.

A mass fraction of the alkali element group in the integrated rod may have a maximum value at a position other than a central axis of the integrated rod. This is because the alkali element group is arranged in the outer peripheral portion of the glass rod immediately after integration. By having the maximum value at other than the central axis, it is possible to suppress the maximum value to be low and suppress defects such as crystallization compared to the case of adding the same total amount so that the mass fraction becomes the maximum at the central axis.

The core portion may include any one of sodium, potassium, rubidium, cesium, and calcium as the alkali element group. In this case, transmission loss can be suppressed.

An optical fiber preform according to an embodiment of the present disclosure is an optical fiber preform made of silica-based glass, comprising: a core portion including an alkali element group including an alkali metal element and an alkaline earth metal element; and a cladding portion that has a refractive index lower than a refractive index of the core portion and surrounds the core portion. The core portion includes a region that has a mass fraction of chlorine lower than a mass fraction of chlorine on a central axis of the core portion. A mass fraction of the alkali element group in the core portion has a maximum value in a region other than the central axis. The mass fraction of the alkali element group in the core portion may have a maximum value in a region within 50% of a radius of the core portion and other than the central axis. The mass fraction of the alkali element group in the core portion has a maximum value in a region within 30% of a radius of the core portion and other than the central axis.

In this optical fiber preform, it is possible to achieve both a reduction of abnormal portions and a reduction of glass defect loss by increasing the mean chlorine concentration in the core portion.

Detailed Description of Embodiments of the Present Disclosure

Specific examples of a method for manufacturing an optical fiber preform and an optical fiber preform of the present disclosure will be described below with reference to the drawings. It should be noted that the present disclosure is not limited to these examples, but is indicated by the scope of the claims and is intended to include all modifications within the meaning and scope equivalent to the scope of the claims. In the description of the drawings, the same elements are denoted by the same reference numerals, and redundant description will be omitted.

Figure 1:
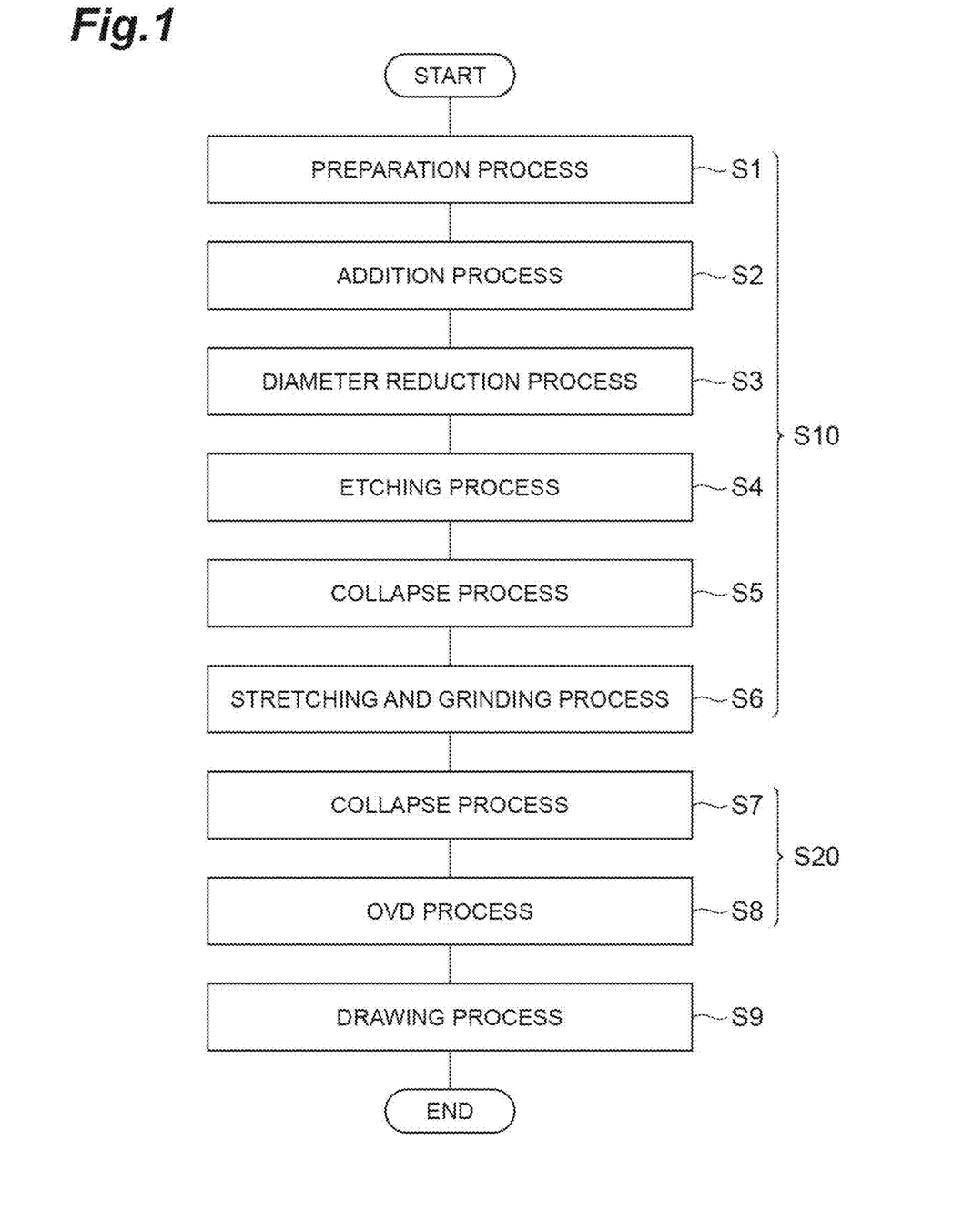
FIG. 1 is a flowchart illustrating a method for manufacturing an optical fiber according to an embodiment.

FIG. 1 is a flowchart illustrating a method for manufacturing an optical fiber according to the present embodiment. In the following description, an example of specific conditions is also described. The optical fiber according to the present embodiment may be manufactured by sequentially performing a preparation process S1, an addition process S2, a diameter reduction process S3, an etching process S4, a collapse process S5, a stretching and grinding process S6, a collapse process S7, an outside vapor deposition (OVD) process S8, and a drawing process S9.

The optical fiber preform 1 (see FIG. 2) according to the present embodiment is manufactured by sequentially performing a core portion forming process S10 of forming the core portion 10 (see FIG. 2) made of silica (quartz)—based glass and a cladding portion forming process S20 of forming the cladding portion 20 surrounding the core portion 10. That is, the method for manufacturing the optical fiber preform 1 includes the core portion forming process S10 and the cladding portion forming process S20. The core portion forming process S10 includes the preparation process S1, the addition process S2, the diameter reduction process S3, the etching process S4, the collapse process S5, and the stretching and grinding process S6. The cladding portion forming process S20 includes the collapse process S7 and the OVD process S8.

The preparation process S1 is a step of preparing the glass pipe and the glass rod for forming the core portion 10. In the present embodiment, the preparation process S1 is performed before the addition process S2, but the glass rod may be prepared before the collapse process S5. That is, the preparation process S1 may include a glass pipe preparation process performed before the addition process S2 and a glass rod preparation process performed before the collapse process S5.

The glass pipe is made of silica-based glass. The glass pipe is a glass pipe in which an alkali element group is to be diffused as a dopant. Here, the alkali element group is a generic name of alkali metal elements and alkaline earth metal elements. That is, the alkali element group consists of alkali metal elements and alkaline earth metal elements. An outer diameter (2d) of the glass pipe is 30 mm or greater and 50 mm or less. An inner diameter (2i) of the glass pipe is 10 mm or greater and 30 mm or less.

The glass rod may be made of silica-based glass. The glass rod is synthesized by, for example, a VAD (vapor phase axial deposition) method. In order to set the diameter of the glass rod to a desired value, process such as stretching and grinding may be performed. The glass rod is integrated with the glass pipe at the collapse process S5 and used to form the integrated rod. The diameter of the glass rod is 3 mm or greater and 15 mm or less.

Each of the glass pipe and glass rod contains a mass fraction of chlorine and fluorine. The mass fraction of other dopants and impurities contained in each of the glass pipe and the glass rod is 10 ppm or less. "Mass fraction" is the ratio of the mass of the element of interest with respect to the mass of the entire object, and is represented by (mass of element of interest)/(total mass). Hereinafter, the mass fraction is also called "concentration".

Figure 2:
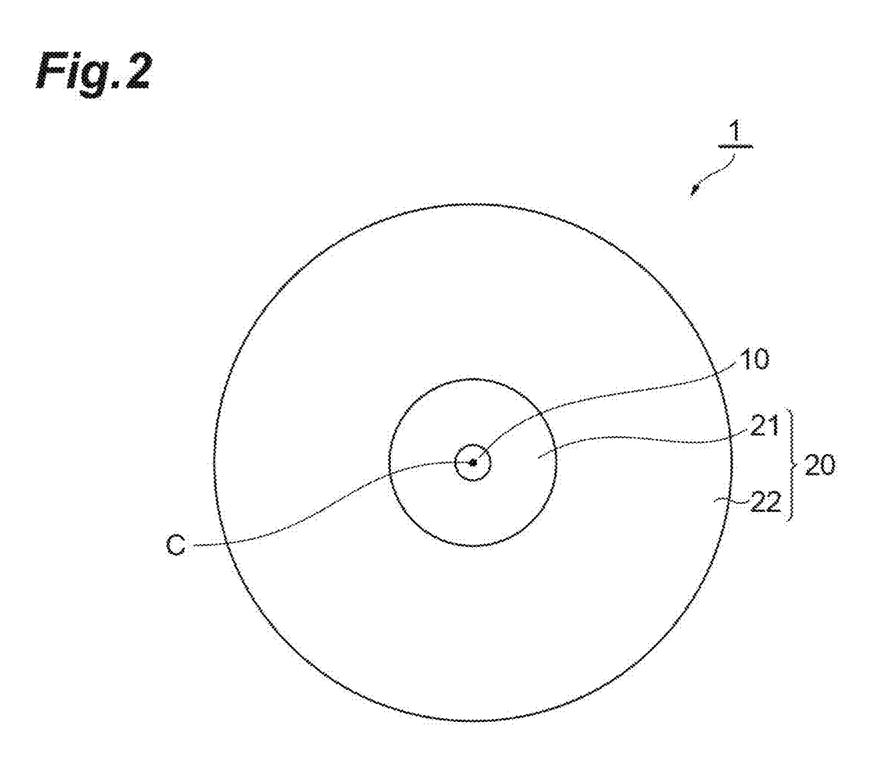
FIG. 2 is a cross-sectional view of an optical fiber preform according to an embodiment.

The mean chlorine concentration in the glass pipe is 20 ppm or greater and 2000 ppm or less. Thereby, the refractive index of the core portion 10 can be higher than the refractive index of the cladding portion 20. As a result, transmission loss can be suppressed. The mean fluorine concentration in the glass pipe is 200 ppm or greater and 5000 ppm or less. Thus, the number of abnormal portions of the optical fiber preform 1 can be suppressed.

The mean chlorine concentration in the glass rod is 20 ppm or greater and 2000 ppm or less. Thereby, the refractive index of the core portion 10 can be higher than the refractive index of the cladding portion 20. As a result, transmission loss can be suppressed. The mean fluorine concentration in glass rod is 200 ppm or greater and 5000 ppm or less. Thus, the number of abnormal portions of the optical fiber preform 1 can be suppressed.

The glass rod has an outer peripheral portion that includes the outer peripheral surface of the glass rod and has a thickness of 0.5 mm. The outer peripheral portion is, for example, a portion that has a radius of 70% or more and 100% or less, or 90% or more and 100% or less of the radius of the glass rod. The mean chlorine concentration in the outer peripheral portion is lower than the mean chlorine concentration in the entire glass rod. The mean chlorine concentration in the outer peripheral portion is 20 ppm or greater and 2000 ppm or less.

Here, the mean concentration is, for example, a concentration represented by the following equation in the case of a mean chlorine concentration.

$$2\int_i^d Cl(r)\cdot r\,dr/d^2-i^2 \qquad [\text{Equation 1}]$$

In the above equation, Cl(r) represents a local chlorine concentration at a position of a radius r. The inner radius of the glass pipe is represented by i. The outer radius of the glass pipe is represented by d. Calculation for fluorine is performed in the same manner. In the case of a glass rod, i is set to 0 and d is set to the radius of the glass rod, and the mean concentrations of chlorine and fluorine are calculated by the above equation. The local concentration is measured by an electron probe micro analyzer (EPMA) as a concentration at each position along a straight line passing through the center position on the end face having the glass pipe and the glass rod. The conditions of measurement by EPMA are, for example, acceleration voltage of 20 kV, probe beam diameter of 0.5 μm or greater and 1 μm or less, and measurement interval of 100 nm or less.

The addition process S2 is a step of adding an alkali element group to an inner surface of a glass pipe made of silica-based glass. When a potassium (K) element is added as a dopant of the alkali element group, for example, potassium bromide (KBr) of 6 g or more and 20 g or less is used as a raw material. Depending on the type of alkali element group to be added, one or more of KBr, potassium iodide (KI), rubidium bromide (RbBr), rubidium iodide (RbI), and the like may be used as the raw material.

In the addition process S2, the raw material is heated to a temperature of 700° C. or more and 850° C. or less by a first external heat source to generate raw material vapor. The first external heat source is, for example, an electric furnace and is provided to heat the raw material. While the generated raw material vapor is introduced into the glass pipe together with a carrier gas composed of oxygen, the glass pipe is heated from the outside by a second external heat source. The second external heat source is, for example, an oxyhydrogen burner, an induction furnace, or a resistance furnace, and is provided to heat the glass pipe. The flow rate of the carrier gas is 1 SLM (1 liter/min in terms of standard conditions (0° C., 1.01×10$^5$ Pa)).

In the addition process S2, the glass pipe is heated by moving the second external heat source along the longitudinal direction of the glass pipe. The heating of the glass pipe is performed by traversing the second external heat source at a speed of 30 mm/min or more and 60 mm/min or less for a total of 8 turns or more and 15 turns or less so that the temperature of the outer surface of the glass pipe becomes 1400° C. or more and 2000° C. or less. Thus, the alkali element group such as K element is diffused and added to the inner surface of the glass pipe.

The diameter reduction process S3 is a step of reducing a diameter of the glass pipe to which the alkali element group is added by the addition process S2. The diameter reduction process S3 is performed between the addition process S2 and the collapse process S5. At this time, the glass pipe is heated from the outside by the second external heat source while flowing oxygen into the glass pipe in a range of 0.5 SLM or more and 1.0 SLM or less. In the diameter reduction process S3, the glass pipe is heated by moving the second external heat source along the longitudinal direction of the glass pipe. The heating of the glass pipe is performed by traversing the second external heat source in a total of 6 turns or more and 10 turns or less so that the outer surface of the glass pipe becomes 1300° C. or more and 2000° C. or less. The diameter of the glass pipe is reduced until the inner diameter thereof becomes larger by about 1 mm to 3 mm than the diameter of the glass rod that is to be integrated in the collapse process S5.

The etching process S4 is a step of etching the inner surface of the glass pipe after the diameter reduction process S3. The etching process S4 is performed between the addition process S2 and the collapse process S5. In the etching process S4, vapor phase etching is performed by heating the glass pipe from the outside by the second external heat source while a mixed gas of SF$_6$ (0.2 SLM or more and 0.4 SLM or less) and chlorine (0.5 SLM or more and 1.0 SLM or less) is introduced into the glass pipe. In this way, the inner surface of the glass pipe containing impurities added together with the target dopant at a high concentration can be scraped, and the impurities can be removed. In the etching process S4, the glass pipe is heated by moving the second external heat source along the longitudinal direction of the glass pipe. The heating of the glass pipe is performed by traversing the second external heat source in a total of 1 turn or more and 5 turns or less so that the outer surface of the glass pipe becomes 1300° C. or more and 2000° C. or less.

The collapse process S5 is a step of integrating the glass pipe and the glass rod disposed inside the glass pipe after the etching process S4. In the collapse process S5, first, a glass rod is inserted into a glass pipe and fixed to the center of the glass pipe. Subsequently, a mixed gas of oxygen (0.1 SLM or more and 0.5 SLM or less) and He (0.5 SLM or more and 1.0 SLM or less) is introduced into the glass pipe, and the glass pipe and the glass rod are integrated by setting the surface temperature to 2000° C. or more and 2300° C. or less while reducing the absolute pressure in the glass pipe to 97 kPa or less. Thus, an integrated rod in which the glass pipe and the glass rod are integrated is formed. The diameter of the integrated rod is 20 mm or greater and 40 mm or less. The mean mass fraction of the alkali element group included in the integrated rod is 0.2 ppm or more and 300 ppm or less. This makes it possible to suppress transmission loss.

In the stretching and grinding process S6, the integrated rod is stretched to have a diameter of 20 mm or more and 25 mm or less, and the outer peripheral portion of the integrated rod is ground to have a diameter of 15 mm or more and 20 mm or less. Thus, a core rod constituting the core portion 10 (see FIG. 2) of the optical fiber preform 1 is obtained.

As a variation, the core portion forming process S10 may further include a glass layer application process of applying a glass layer around the integrated rod after the stretching and grinding process S6. In this case, a glass layer and an integrated rod are used together as a core rod constituting the core portion 10 (see FIG. 2) of the optical fiber preform 1. The glass layer is applied by a known method such as an OVD method or a collapse method.

The glass layer has a refractive index higher than that of the cladding portion 20 (the first cladding portion 21 and the second cladding portion 22; FIG. 2). The glass layer does not include an alkali element group. The glass layer contains chlorine. The mean chlorine concentration in the glass layer is 100 ppm or greater and 2000 ppm or less.

In the rod-in collapse process S7, the first cladding portion 21 (see FIG. 2) is provided outside the core portion 10. At this time, a rod-in-collapse method is used. That is, the core portion 10 is inserted into a glass pipe of silica-based glass to which fluorine is added, and both are heated and integrated by an external heat source. The difference in refractive index normalized by the refractive index of pure silica glass between the core portion 10 and the first cladding portion 21 is about 0.34% at maximum. As a result of the addition of the first cladding portion 21 by the rod-in-collapse method, it is possible to suppress the water content of the core portion 10 and the first cladding portion 21 in the vicinity thereof to be sufficiently low.

In the OVD process S8, a rod in which the core portion 10 and the first cladding portion 21 are integrated is stretched to have a predetermined radius, and then the second cladding portion 22 (see FIG. 2) including fluorine is synthesized on the outside of the rod by the OVD method, thereby manufacturing the optical fiber preform 1.

In the drawing process S9, an optical fiber can be obtained by drawing the optical fiber preform 1. The drawing speed is 800 m/min or more and 2300 m/min or less, and the drawing tension is 0.5 N, for example.

FIG. 2 is a cross-sectional view of the optical fiber preform according to the present embodiment. As shown in FIG. 2, the optical fiber preform 1 includes a core portion 10 having a central axis C and a cladding portion 20. The core portion 10 includes an alkali element group, chlorine, and fluorine. Accordingly, the viscosity of the core is reduced during drawing and rearrangement of the glass is promoted. Accordingly, the transmission loss of the optical fiber due to the rayleigh scattering is reduced, and thus the transmission loss may be reduced. The core portion 10 includes any one of sodium, potassium, rubidium, cesium, and calcium as an alkali element group. The mean concentration of the alkali element group in the core portion 10 is 3 ppm or greater and 200 ppm or less. The mean concentration of chlorine in the core portion 10 is 30 ppm or greater and 2000 ppm or less. The mean concentration of fluorine in the core portion 10 is 500 ppm or greater and 5000 ppm or less.

The cladding portion 20 is provided outside of the core portion 10 and surrounds the core portion 10. The cladding portion 20 has a refractive index that is lower than the refractive index of the core portion 10. The cladding portion 20 has a first cladding portion 21 and a second cladding portion 22. The first cladding portion 21 is provided outside the core portion 10 and surrounds the core portion 10. The first cladding portion 21 is made of silica-based glass. The first cladding portion 21 contains fluorine. The difference in refractive index normalized by the refractive index of pure silica glass between the core portion 10 and the first cladding portion 21 is about 0.34% at maximum.

The second cladding portion 22 is provided outside the first cladding portion 21, and surrounds the first cladding portion 21. The second cladding portion 22 is made of silica-based glass. The second cladding portion 22 contains fluorine. The difference in refractive index normalized by the refractive index of pure silica glass between the first cladding portion 21 and the second cladding portion 22 is about 0.05% to 0.2%.

Figure 3:
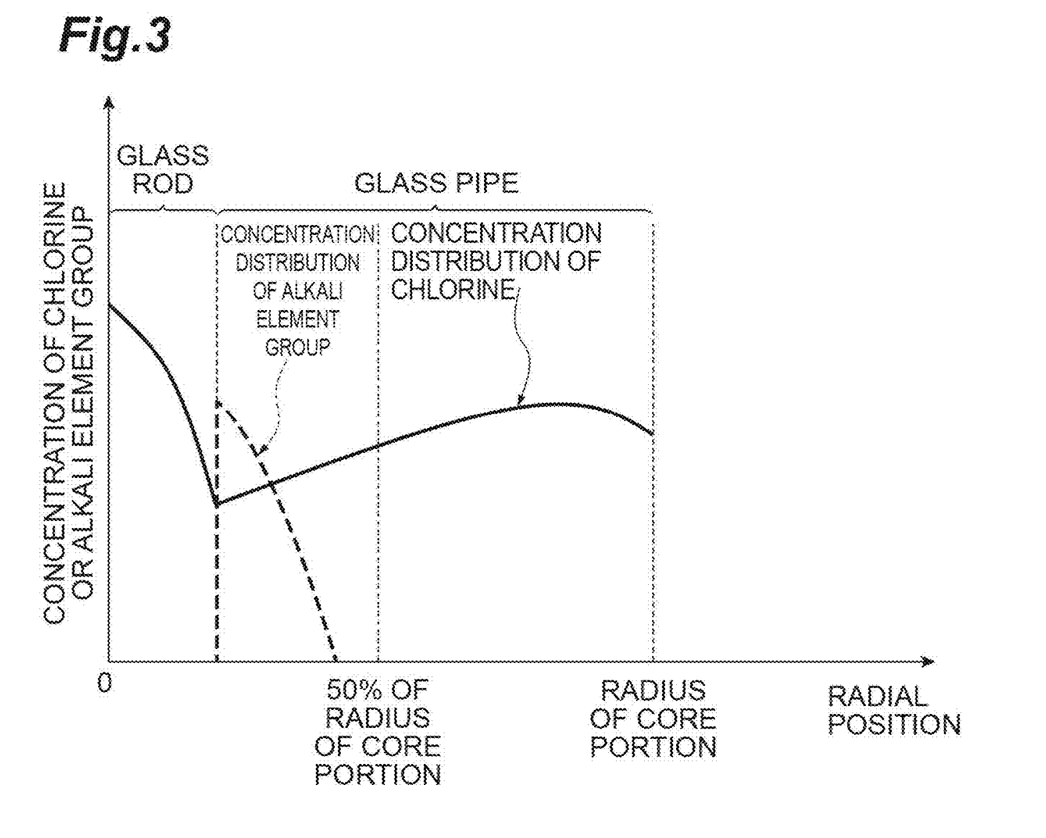
FIG. 3 is a graph showing concentration distribution of alkali element and concentration distribution of chlorine in a core portion.

FIG. 3 is a graph showing an example of concentration distribution of alkali element and concentration distribution of chlorine in a core portion. The horizontal axis indicates a distance (radial position) from the central axis C of the core portion 10. The vertical axis indicates alkali element concentration or chlorine concentration. The lowest part of the concentration distribution of chlorine is the boundary between the glass rod and the glass pipe. On the pipe side of the boundary, there is a region to which an alkali element group is added. In addition, for the purpose of achieving both suppression of crystallization and suppression of glass defects, the chlorine concentration in the rod central portion to which the alkali element group is not added is high, and the chlorine concentration in other portions including the pipe portion is lower than that of the rod central portion.

The concentration of alkali element group in the core portion 10 has a maximum value except for the central axis C. The alkali element group in the core portion 10 is added to the inner surface of the glass pipe in the addition process S2. Therefore, the position of the maximum value corresponds to the inner peripheral portion of the glass pipe used in the collapse process S5. The concentration of the alkali element group in the core portion 10 has a maximum value at a position other than the central axis C in a region within 50% of the radius of the core portion 10. The concentration of the alkali element group in the core portion 10 may have a maximum value at a position other than the central axis C in a region within 30% of the radius of the core portion 10.

Table 1 shows the mean chlorine concentration in the outer peripheral portion of 0.5 mm thickness of the glass rod used in the collapse process S5 and the state after integration (the number of abnormal portions) for prototype examples 1 to 8 of the integrated rod manufactured by the above-described manufacturing method (the integrated rod immediately after the integration process S5 and before the stretching and grinding process S6). In the collapse process S5, the glass rod comes into contact with the alkali element group added to the inner circumferential surface of the glass pipe. Therefore, when the chlorine concentration in the outer peripheral portion of the glass rod is high, the occurrence rate of defects (abnormal portions) increases. When the mass fraction of chlorine becomes 2500 ppm, an increase in the occurrence rate of defects becomes significant, and the number of abnormal portions increases.

TABLE 1

| Prototype example | Mean Cl concentration in outer peripheral portion of glass rod [ppm] | Number of abnormal portions |
| --- | --- | --- |
| 1 | 2510 | 13 |
| 2 | 2030 | 8 |
| 3 | 1460 | 5 |
| 4 | 1090 | 4 |
| 5 | 550 | 2 |
| 6 | 220 | 0 |
| 7 | 110 | 0 |
| 8 | 20 | 0 |

In prototype examples 1 to 8, in the addition process S2, potassium (K) elements were used as dopants of alkali element groups, and the local K concentration added to the inner circumferential surface of the glass pipe was unified in a range of 100 ppm or more and 200 ppm or less. Therefore, it is considered that the increase in the number of abnormal portions is not caused by the influence of the K concentration but caused by the chlorine concentration in the outer peripheral portion of the glass rod.

Table 2 shows various characteristics of prototype examples 9 to 13 of the integrated rod manufactured by the above-described manufacturing method. In prototype examples 9 to 13, the sizes and compositions other than the integrated rod were made equal to each other. It can be seen that increasing the mean chlorine concentration in the integrated rod reduces the transmission loss. This is considered to be because chlorine contained in the integrated rod can repair structural defects of glass generated during drawing and reduce transmission loss caused by defects. In prototype examples 9 to 13, since the mean chlorine concentration in the outer peripheral portion of 0.5 mm thickness of the glass rod is unified to about 1000 ppm, the number of abnormal portions after integration is also suppressed to a small number.

TABLE 2

| Prototype example | Mean Cl concentration in integrated rod [ppm] | Mean Cl concentration in outer peripheral portion of glass rod [ppm] | Mean Cl concentration in outer peripheral portion of glass pipe [ppm] | Mean F concentration in outer peripheral portion of glass pipe [ppm] | Number of abnormal portions | Transmission loss [dB/km] |
| --- | --- | --- | --- | --- | --- | --- |
| 9 | 2020 | 970 | 980 | 2510 | 2 | 0.145 |
| 10 | 1510 | 1010 | 970 | 2470 | 3 | 0.146 |
| 11 | 1010 | 1030 | 1010 | 2500 | 2 | 0.148 |
| 12 | 680 | 980 | 970 | 2480 | 2 | 0.149 |
| 13 | 380 | 980 | 990 | 2510 | 1 | 0.151 |

Table 3 shows characteristics of prototype examples 14 to 19 of the integrated rod manufactured by the above-described manufacturing method. It can be seen that the preform abnormality (number of abnormal portions) is increased when the mean fluorine concentration in the glass rod is increased. Therefore, the mean fluorine concentration in glass rod is preferably 7000 ppm or less, and more preferably 5500 ppm or less.

TABLE 3

| Prototype example | Mean Cl concentration in outer peripheral portion of glass rod [ppm] | Mean F concentration in outer peripheral portion of glass rod [ppm] | Number of abnormal portions |
| --- | --- | --- | --- |
| 14 | 1010 | 290 | 1 |
| 15 | 1020 | 680 | 1 |
| 16 | 1040 | 1520 | 2 |
| 17 | 1020 | 3090 | 1 |
| 18 | 1000 | 5480 | 4 |
| 19 | 1010 | 7430 | 8 |

REFERENCE SIGNS LIST

1 Optical fiber preform
10 Core portion
20 Cladding portion
21 First cladding portion
22 Second cladding portion
C Central axis

The invention claimed is:

1. A method for manufacturing an optical fiber preform made of silica-based glass, the method comprising:
   forming a core portion; and
   forming a cladding portion that has a refractive index lower than a refractive index of the core portion and surrounds the core portion,
   wherein the forming the core portion comprises:
   adding an alkali element group including an alkali metal element and an alkaline earth metal element to an inner surface of a glass pipe made of silica-based glass;
   integrating the glass pipe and a glass rod disposed inside the glass pipe to form an integrated rod after the adding; and
   applying a glass layer around the integrated rod, the glass layer having a refractive index higher than that of the cladding portion,
   wherein a mean value of a mass fraction of chlorine in the glass layer is 100 ppm or greater and 2000 ppm or less.

2. The method for manufacturing an optical fiber preform according to claim 1, wherein the forming the core portion further comprises reducing a diameter of the glass pipe between the adding and the integrating.

3. The method for manufacturing an optical fiber preform according to claim 1, wherein the forming the core portion further comprises etching an inner surface of the glass pipe between the adding and the integrating.

4. The method for manufacturing an optical fiber preform according to claim 1, wherein a mean value of a mass fraction of chlorine in the glass rod is 20 ppm or greater and 2000 ppm or less.

5. The method for manufacturing an optical fiber preform according to claim 1, wherein a mean value of a mass fraction of chlorine in the glass pipe is 20 ppm or greater and 2000 ppm or less.

6. The method for manufacturing an optical fiber preform according to claim 1, wherein a mean value of a mass fraction of fluorine in the glass rod is 200 ppm or greater and 5000 ppm or less.

7. The method for manufacturing an optical fiber preform according to claim 1, wherein a mean value of a mass fraction of fluorine in the glass pipe is 200 ppm or greater and 5000 ppm or less.

8. The method for manufacturing an optical fiber preform according to claim 1, wherein the glass rod includes an outer peripheral portion including an outer peripheral surface of the glass rod and having a thickness of 0.5 mm, and a mean value of a mass fraction of chlorine in the outer peripheral portion is lower than a mean value of a mass fraction of chlorine in an entirety of the glass rod.

9. The method for manufacturing an optical fiber preform according to claim 8, wherein the mean value of the mass fraction of chlorine in the outer peripheral portion is 20 ppm or greater and 2000 ppm or less.

10. The method for manufacturing an optical fiber preform according to claim 1, wherein a mean mass fraction of the alkali element group included in the integrated rod is 0.2 ppm or greater and 300 ppm or less.

11. The method for manufacturing an optical fiber preform according to claim 1, wherein a mass fraction of the alkali element group in the integrated rod has a maximum value at a position other than a central axis of the integrated rod.

12. The method for manufacturing an optical fiber preform according to claim 1, wherein the core portion includes any one of sodium, potassium, rubidium, cesium, and calcium as the alkali element group.

* * * * *